(12) United States Patent
Rami (10) Patent No.: US 11,326,863 B2
(45) Date of Patent: May 10, 2022

(54) VISUAL GUIDANCE SYSTEM FOR BARREL-FIRED PROJECTILES

(71) Applicant: Shyam Swaminadhan Rami, Kerla (IN)

(72) Inventor: Shyam Swaminadhan Rami, Kerla (IN)

( * ) Notice: Subject to any disclaimer, the term of this patent is extended or adjusted under 35 U.S.C. 154(b) by 561 days.

(21) Appl. No.: 16/375,425

(22) Filed: Apr. 4, 2019

(65) Prior Publication Data

US 2020/0064112 A1 Feb. 27, 2020

Related U.S. Application Data (60) Provisional application No. 62/723,030, filed on Aug. 27, 2018.

(51) Int. Cl.
| | | |
|---|---|---|
| *F42B 15/10* | (2006.01) | |
| *B64D 1/04* | (2006.01) | |
| *F42B 10/62* | (2006.01) | |
| *F41G 9/00* | (2006.01) | |

(52) U.S. Cl.
CPC .............. *F42B 15/105* (2013.01); *B64D 1/04* (2013.01); *F42B 10/62* (2013.01); *F41G 9/00* (2013.01)

(58) Field of Classification Search
CPC ........ F42B 10/60; F42B 1/062; F42B 15/105; B64D 1/04; F41G 9/00
USPC ........................................... 244/3.1
See application file for complete search history.

(56) References Cited

U.S. PATENT DOCUMENTS

| | | | | |
|---|---|---|---|---|
| 7,163,176 B1* | 1/2007 | Geswender | ............. | F42B 10/64 |
| | | | | 244/3.27 |
| 8,115,149 B1* | 2/2012 | Manole | ................... | F42B 15/01 |
| | | | | 244/3.14 |
| 9,086,258 B1* | 7/2015 | Vasudevan | ............... | F41G 7/222 |
| 2007/0241227 A1* | 10/2007 | Zemany | .................. | F41G 7/226 |
| | | | | 244/3.1 |
| 2010/0326264 A1* | 12/2010 | Roemerman | ............ | B64D 1/06 |
| | | | | 89/1.56 |
| 2012/0048991 A1* | 3/2012 | Frey, Jr. | ................ | F42B 10/666 |
| | | | | 244/3.15 |
| 2012/0175459 A1* | 7/2012 | Geswender | ............. | F42B 10/26 |
| | | | | 244/3.24 |
| 2017/0115103 A1* | 4/2017 | Chargelegue | ........... | F42B 10/26 |

* cited by examiner

*Primary Examiner* — Brady W Frazier
(74) *Attorney, Agent, or Firm* — Law Offices of Steven W. Weinrieb (57) ABSTRACT

A winged external guidance frame placed on the muzzle that can couple with a projectile while exiting the barrel utilizing the kinetic energy of the projectile to travel to the target while the accuracy is provided by on board electronics and corrected using the wings. Alternately a reusable unmanned aerial system that travels in the speed and direction of the projectile and couples with the projectile as it exits the barrel.

8 Claims, 8 Drawing Sheets

VISUAL GUIDANCE SYSTEM FOR BARREL-FIRED PROJECTILES

CROSS-REFERENCE TO RELATED PATENT APPLICATIONS

This patent application is a non-provisional conversion of U.S. Provisional Patent Application No. 62/723,030 which was filed on Aug. 27, 2018, the priority benefits of which are hereby claimed.

FIELD OF THE INVENTION

The present invention is related to the field of defense; more specifically to the application of artillery or other projectile guidance systems.

BACKGROUND OF THE INVENTION

The conventional artillery shells or other projectiles use very expensive hardened electronics to provide navigational guidance for precision impact. These expensive conventional electronic guidance systems are capable of withstanding very high pressure, vibrations and temperature generated inside the barrel of an artillery gun however, despite being expensive these conventional guidance systems still have very limited capabilities in terms of sensors that can be deployed, range and maneuverability. This is because the guidance electronic systems are designed to operate from inside the barrel to withstand the very high temperature, pressure and vibrations. The other option is to use aircrafts to carry the projectiles but, in this case too, very large aircrafts are required to lift heavy payloads. The present invention aims to solve these issues by the exact opposite approach.

SUMMARY OF THE INVENTION

The present invention aims to convert an artillery shell or any projectile into an unmanned aerial system with cheaper electronic navigation system and which is more versatile, capable of hitting even moving targets behind mountains with pin-point accuracy. This invention also eliminates the need for using aircrafts to carry the projectile instead uses the kinetic energy of the fired projectile to carry the winged guidance frame. Hardened expensive military electronics is required when the navigation system is inside the barrel as part of the ammunition, thus experiencing great stress, vibration and high temperature. The solution to this problem is to have the navigation system outside the box, i.e., in this case outside the barrel (OTB) and external navigation system can be coupled with the projectile and use the projectile's energy to carry the external guidance aerial system. This external platform not only allows the use of the conventional GPS, INS, Laser guidance etc., but also allows the usage of the sensitive electronics like camera sensors thus allowing the artillery to be guided visually. Taking the solution outside the barrel also allows the usage of wider wings, cheaper electric motors and also better power supply; thus, improving the performance and the range. This invention is a winged guidance platform that enables the usage of cheaper electronic systems for navigation, guidance and communication, which couples with the projectile outside the barrel and guides it to the target accurately. The rifling of the barrel to provide the accuracy by spinning the projectile is also now made unnecessary by this invention. This external guidance device is attached to the projectile via a male coupling rod which clutches on to the female receiver while exiting the barrel.

DETAILED DESCRIPTION OF THE INVENTION

Referring now to the invention in more detail, various methods of attaching the economical external guidance systems on the projectile is described in the following paragraphs.

Figure 1A:
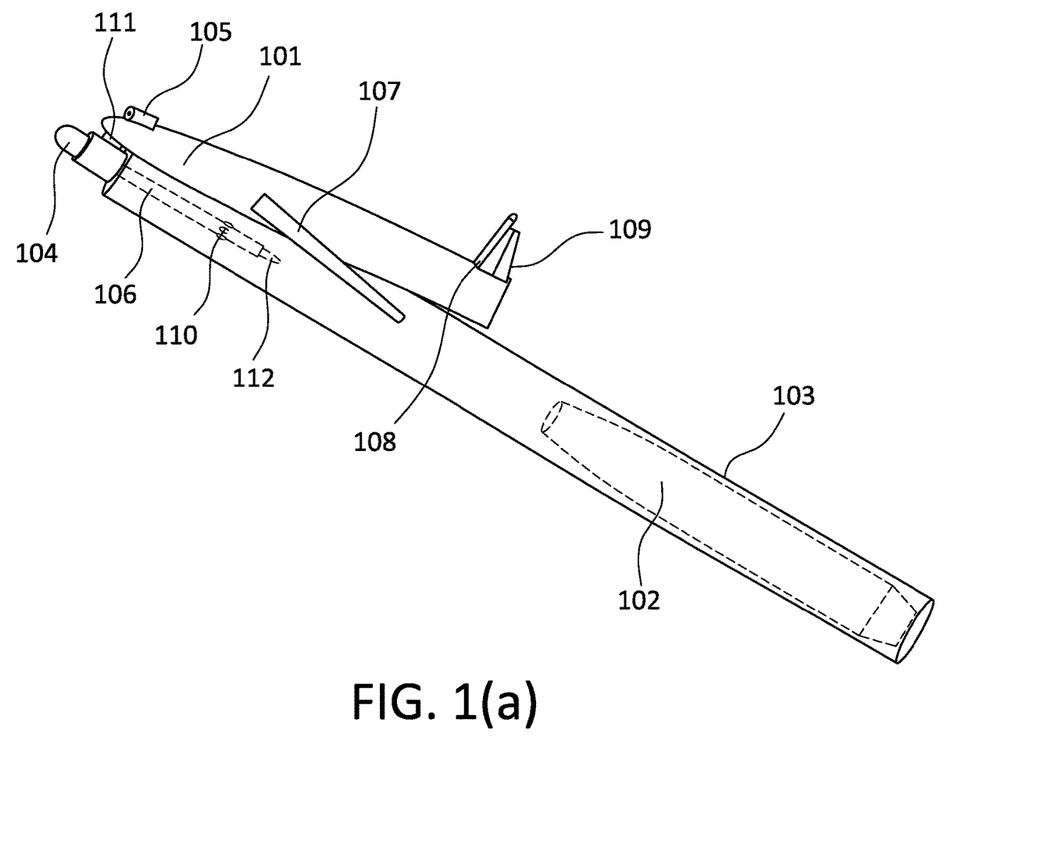
FIGS. 1a and 1b show the projectile's external frame guidance aerial platform placed at the muzzle with the fuse that will couple with the projectile.

FIG. 1a shows the muzzle end of the barrel where the external guidance hollow-frame (101) is placed. The external guidance system shown here has a proximity fuse (104) connected to the detonator (112), a camera (105), the coupling rod (106), the wings (107), the optional rudder (109) and a communication antenna (108). When the projectile (102) advances towards the muzzle, it compresses the coupling rod (106) which releases the claws (110) that grip on the ammunition's receiver from the inside. The electronic navigation components like GPS and INS are placed inside the external guidance device's frame and hence they experience very little heat, vibration and pressure compare to that generated inside the barrel. Conventional ammunitions follow a parabolic path but with this external guidance device or vehicle, a moving projectile can be hit vertically even if it is behind a mountain. The frame may have a parachute to make smooth landing. For example, if communication systems are jammed by the enemy or some broken, then the soldiers can use dummy rounds to land the frame on friendly site and pass information wherein the onboard autonomous autopilot can guide the frame visually.

Figure 1B:
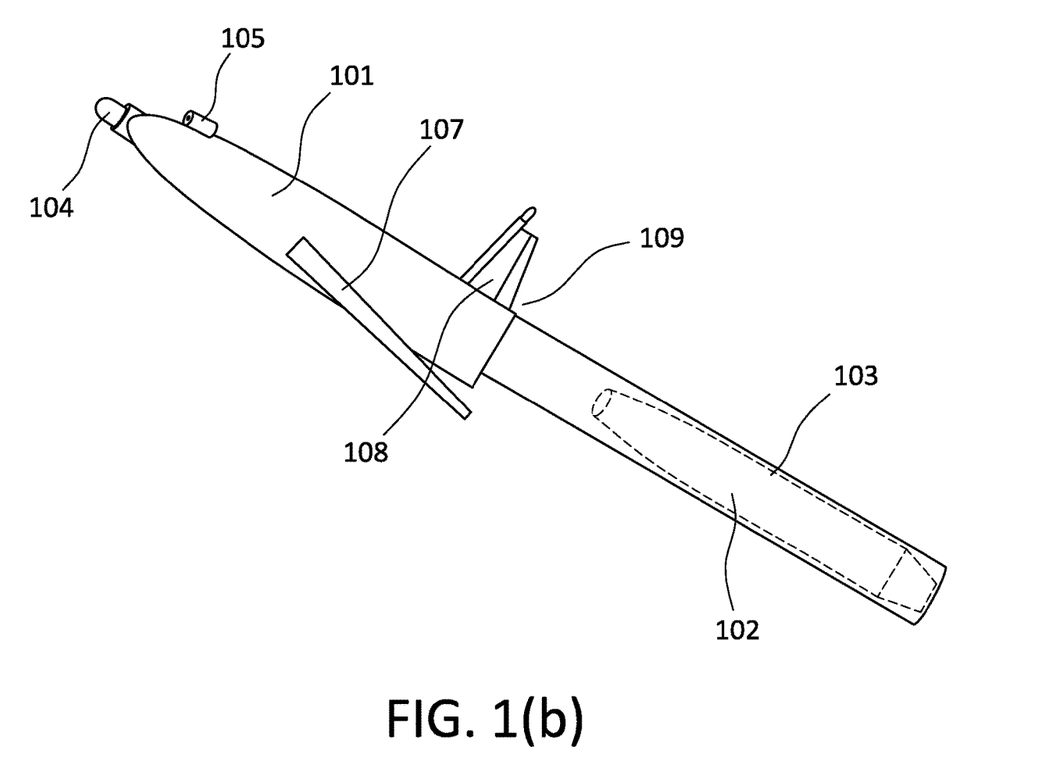

FIG. 1b shows an alternate design of the external guidance hollow-frame system the only difference here is that the hollow frame of the system covers the barrel and is fixed there manually or by robotic arm. The external frame tightly encompasses the periphery of the projectile and is carried by the projectile while the electronics onboard the winged frame guide the projectile accurately to target.

Figure 2:
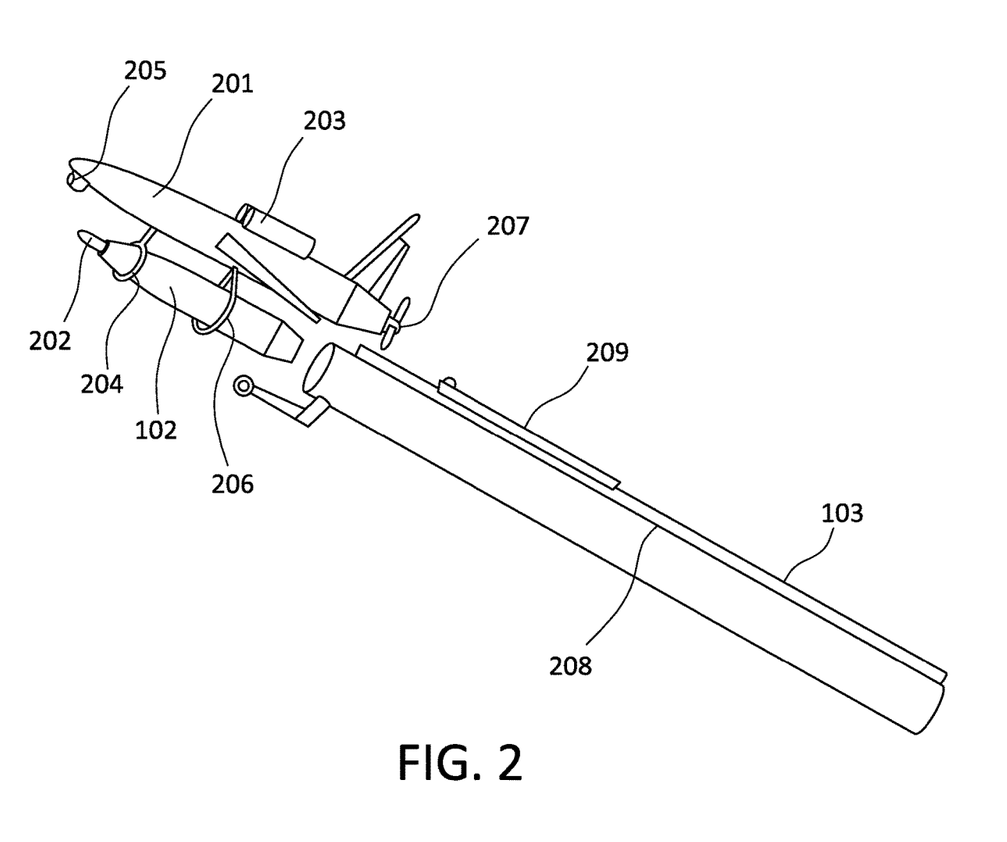
FIG. 2 shows an external unmanned aerial system (UAS) that nets or captures the traditional artillery projectile where the fuse is part of the projectile however the guidance is provided by the UAS.

FIG. 2 shows the external guidance vehicle (201) which travels in the direction of the projectile and captures or couples with the projectile using a nose entrapment device (204) and/or a gripping claw (204). This technique is ideal for projectiles moving with very high velocities. By travelling in the direction and speed of the projectile the impact force between the external guidance vehicle and the projectile is drastically reduced. The external guidance vehicle can be provided the command to start the same time the projectile is about to be triggered by wire or wirelessly. The external guidance vehicle may even be launched by a catapult. Depending upon the speed of the projectile, an appropriate catapult system may be used to generate approximately the same speed as the projectile, such as, for example, an electrical rail system, gas-based system, or the like. In FIG. 2, the rail system is shown, wherein the external guidance vehicle is placed on the launch plate (209) which is propelled on the rail (208). The boosters or miniature jet-engines may also be used to launch the guidance vehicle and will help it to travel further, hover around the target and also to return back to base after releasing or dropping the projectile on the target. The external guidance vehicle is incapable to lifting the projectile hence it travels towards the target by attaching itself to the projectile utilizing the projectile's kinetic-energy but while returning it can use its own propeller (207) making it reusable and capable of collecting real time intelligence during the flight and relaying the information back via the antenna. The guidance vehicle may be launched a little before the projectile is triggered such that the entrapment ring or device is unfolded at the muzzle the same time the projectile's nose pops out of the muzzle.

Figure 3A:
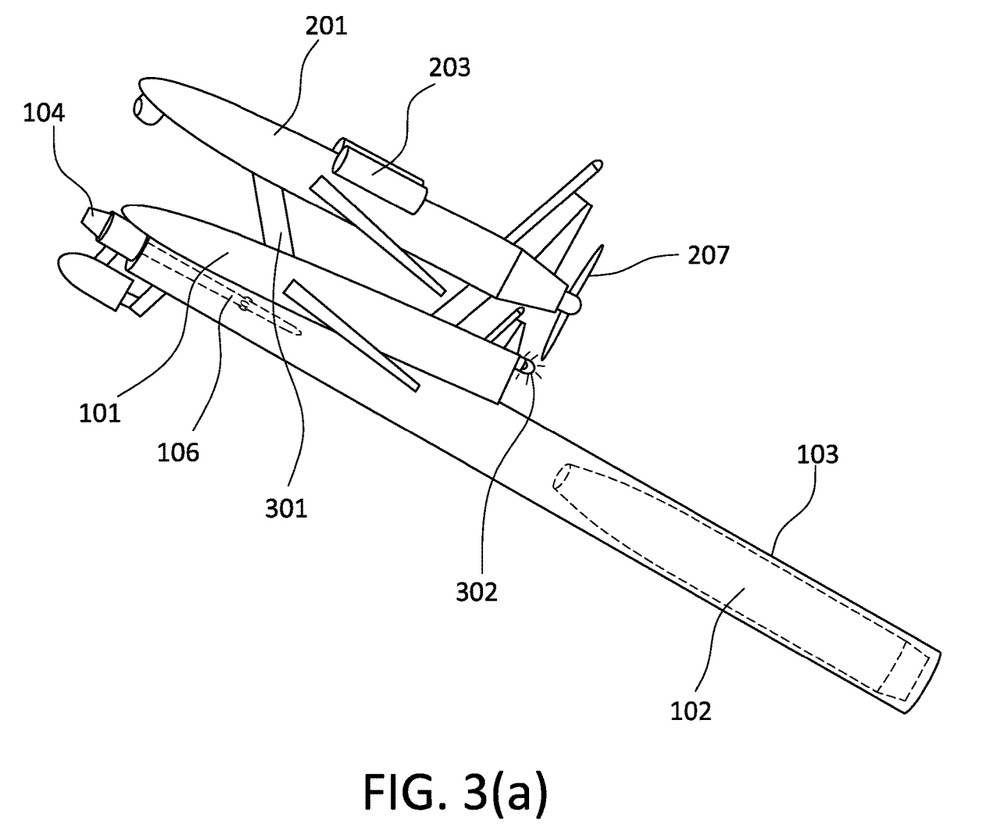
FIG. 3a shows a UAS coupled with an external hollow frame, such that the UAS can break away from the frame before the impact to maintain clear line of sight for communication.

FIG. 3a shows a more advanced option of dual guidance system, combining the external guidance vehicle with the external guidance hollow frame attached to each other by detachable or retracting arms (301). The external hollow frame also has a LED (302) on it to help guide it to the target.

Figure 3B:
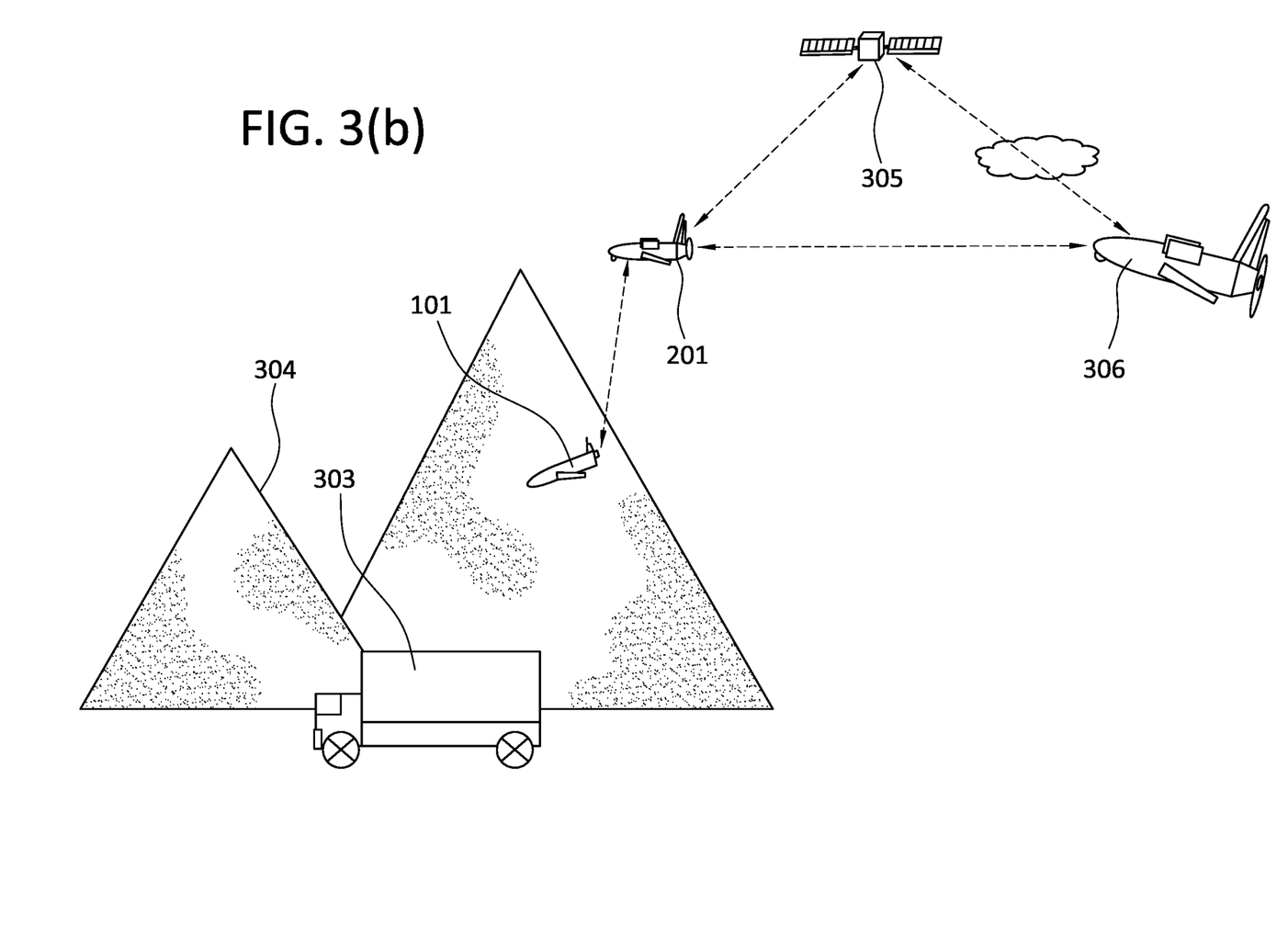
FIG. 3B shows the dual guidance system in action.

FIG. 3b shows the dual guidance system in action wherein the external frame detaches from the vehicle to hit a moving target (303) behind the mountains (304). As the projectile inside the hollow frame is steered to the target, the external guidance vehicle maintains clear line of communication with the network communicating with the link available to nearest network access points like following rounds or satellite or the nearest communication/network drone with on board transceivers to receive command and share data. The reusable vehicle may have more sophisticated electronics while the frame may have cheaper options.

Figure 4A:
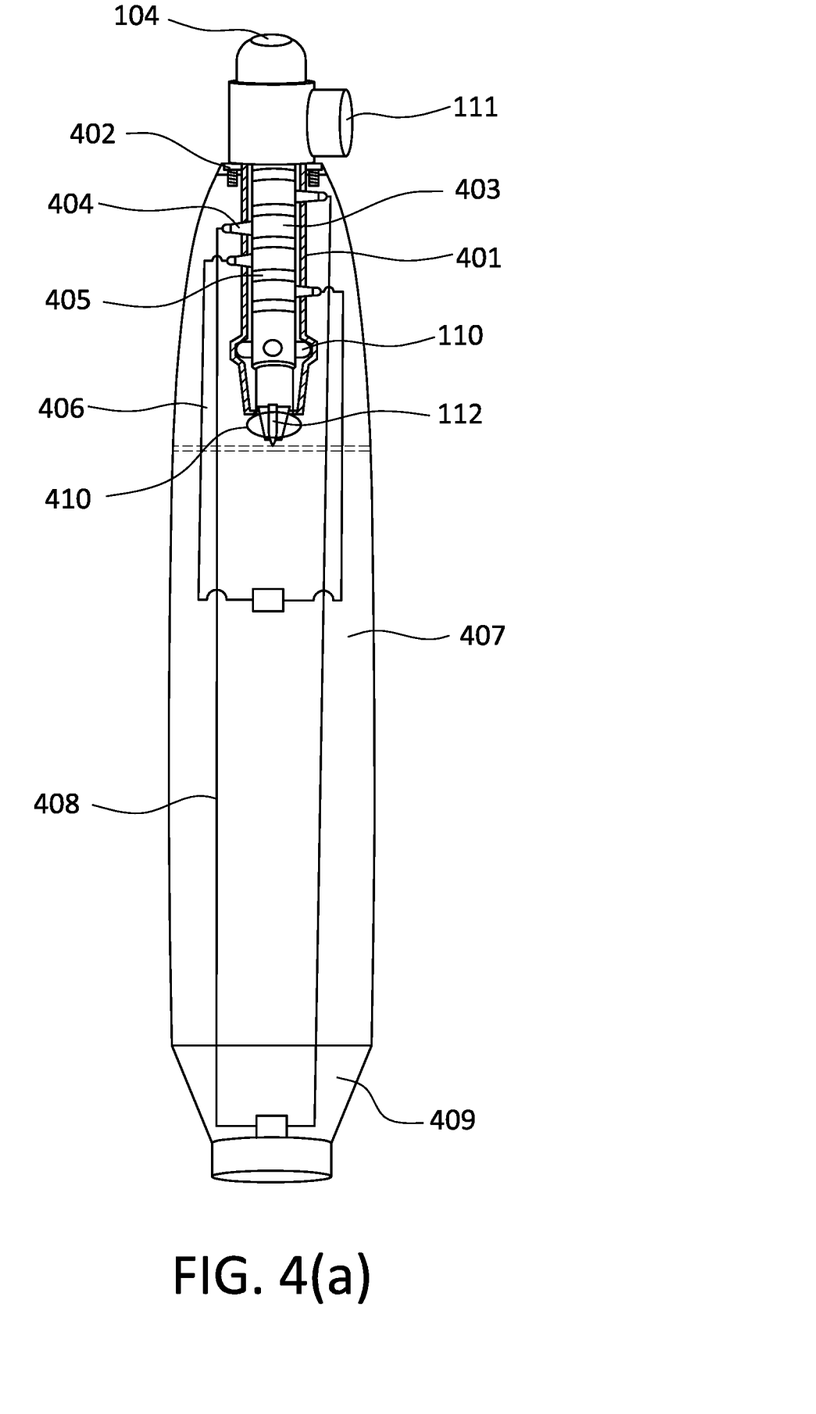
FIGS. 4a and 4b show the coupling rod and receiver coupled in alternate methods.

FIG. 4a shows in detail the projectile with the female receiver (401) fixed with the screws (402) on it, while the external male coupling rod cum fuse is attached to the receiver with the claws (110) which are released when the rod is in contact with the receiver and is compressed. The coupling rod is shown to have the insulated command contact points (403) or segments, similar to a headphone jack, separated by insulation (405). The external guidance frame can issue the commands to propel or detonate the projectile via the input port (111) or the programmable proximity fuse can detonate the projectile if no input is received while approaching the target. For example, when the external guidance frame issues the command to trigger the propellant (409) in the rear of the projectile; the command is passed through the segmented contact points (403) on the rod through the contact points on the receiver (404). The detonator (112) can receive the input from the fuse or from the external frame to ignite the triggering charge (406) and the main charge (407). Instead of claws the coupling rod might alternately have a small inflating object (410) that prevents the separation of the coupling rod from the receiver.

Figure 4B:
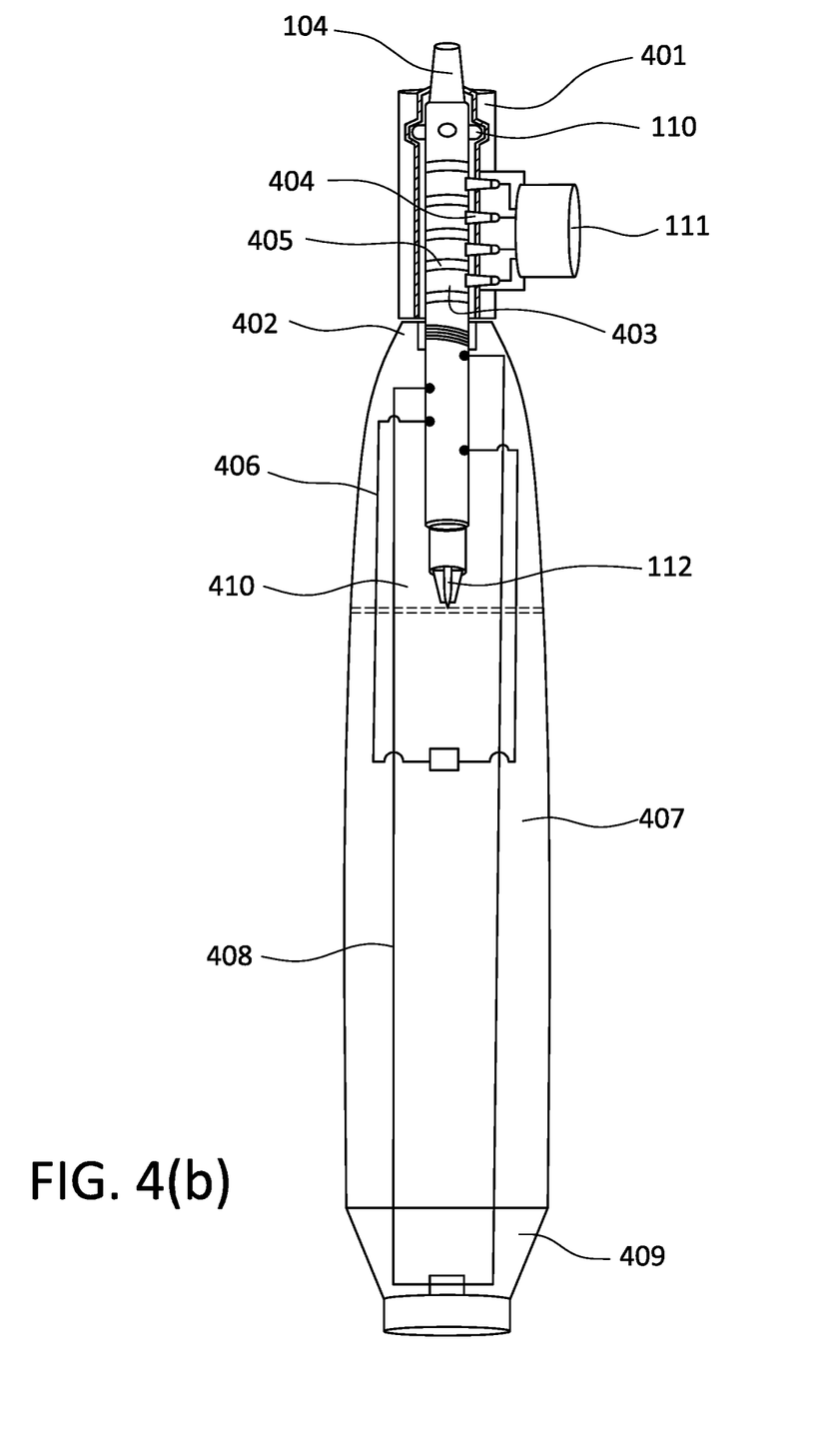

Alternatively the female receiver may be part of the external frame with input contacts and the male coupling rod attached to the projectile as shown in FIG. 4b. Instead of explosives a projectile may carry inflatable material that will help the projectile act as a buoy to float on water or have a parachute with hardened nose-pole to hit the ground smoothly; the external frame's onboard transceivers and radio for communication and positioning.

Figure 5:
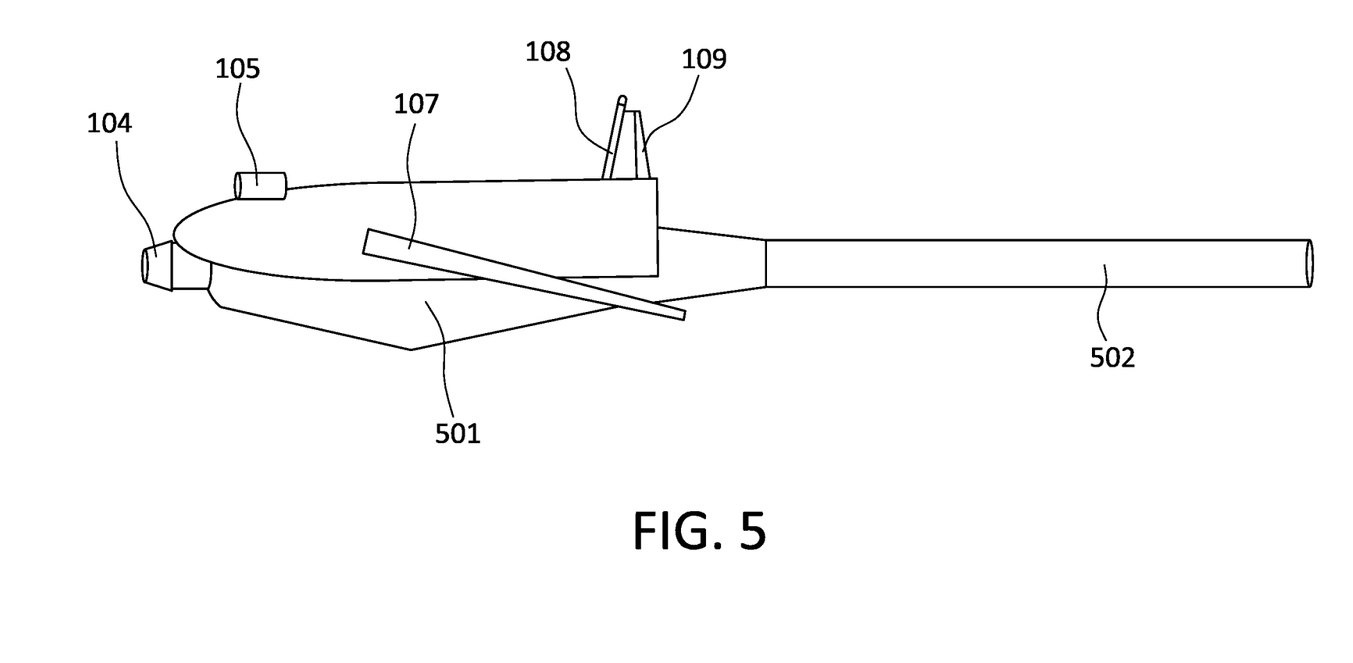
FIG. 5 shows the external guidance frame being attached to a rocket propelled grenade (RPG).

FIG. 5 shows the external guidance frame attached to a rocket propelled grenade (501) having the rocket motor (502) but no stabilization fins are required on the RPG since the external guidance frame has wings (107) to accurately guide the RPG. The onboard computer and camera can help guide the weapon to the correct target and steer away from unintended objects. The weapon can also be controlled manually by communicating with the antenna (108) when greater discrimination is required before detonation. The same setup can be used in a miniature version to guide bullets and this can lead to drastic reduction in friendly fire or killing of innocent unintended people by guiding the projectile accurately to the locked target every time.

The invention claimed is:

1. A visual guidance system for a projectile, comprising:
a hollow winged external guidance frame disposed over a muzzle end of a barrel within which a projectile is disposed and which is adapted to be attached to said projectile when said projectile exits said barrel as a result of said projectile entering said hollow winged external guidance frame such that said hollow winged external guidance frame will then be carried by said projectile, and wherein said hollow winged external guidance frame is capable of maneuvering said projectile toward a target by utilizing wings of said hollow winged external guidance frame and onboard electronics;
a proximity fuse assembly fixedly attached to said hollow winged guidance frame;
wherein said hollow winged external guidance frame encompasses said muzzle end of said barrel and thereafter encompasses an outer peripheral portion of said projectile after said projectile enters said hollow winged external guidance frame which encompasses said muzzle end of said barrel and exits said muzzle end of said barrel; and
at least one set of male and female connectors respectively mounted upon said proximity fuse assembly and said projectile so as to operatively connect said proximity fuse assembly and said hollow winged external guidance frame to said projectile when said projectile enters said hollow winged external guidance frame and exits said barrel such that said hollow winged external guidance frame is carried by said projectile whereby said onboard electronics of said hollow winged external guidance frame guide said projectile toward a target.

2. The system as claimed in claim 1, wherein:
said proximity fuse assembly of said hollow winged external guidance frame comprises a coupling rod;
said projectile includes a receiver;
an input port is provided upon said proximity fuse assembly of said hollow winged external guidance frame so as to receive input command pulses from said onboard electronics of said winged external guidance frame;
input/output contact points are respectively mounted upon said coupling rod of said hollow winged external guidance frame and said receiver of said projectile for receiving input command pulses from said input port mounted upon said proximity fuse assembly of said hollow winged external guidance frame and for transmitting said input command pulses to said receiver mounted upon said projectile; and
a detonator is mounted upon said projectile for receiving a detonation command from said contact points of said receiver.

3. The system as claimed in claim 2, wherein:
said at least one set of male and female connectors mounted upon said proximity fuse assembly of said hollow winged external guidance frame and said projectile, so as to operatively connect said proximity fuse assembly and said hollow winged external guidance frame to said projectile, comprises at least one set of movable male claws mounted upon said coupling rod of said proximity fuse assembly and at least one set of female sockets defined within said receiver of said projectile for accommodating said at least one set of movable male claws of said coupling rod.

4. The system as claimed in claim 1, further comprising:
a dual external guidance system comprising said hollow winged external guidance frame that is attached said projectile, and an external guidance vehicle detachably attached to said hollow winged external guidance frame so as to be reusable.

5. A visual guidance system for a projectile, comprising:
a hollow winged external guidance frame disposed over a muzzle end of a barrel within which a projectile is disposed and which is adapted to be attached to said projectile when said projectile exits said barrel as a result of said projectile entering said hollow winged external guidance frame such that said hollow winged external guidance frame will then be carried by said projectile, and wherein said hollow winged external guidance frame is capable of maneuvering said projectile toward a target by utilizing wings of said hollow winged external guidance frame and onboard electronics;
a proximity fuse assembly fixedly attached to said projectile;
wherein said hollow winged external guidance frame encompasses said muzzle end said barrel and thereafter encompasses an outer peripheral portion of said projectile after said projectile enters said hollow winged external guidance frame which encompasses said muzzle end of said barrel and exits said muzzle end of said barrel; and
at least one set of male and female connectors respectively mounted upon said proximity fuse assembly and said hollow winged external guidance frame so as to operatively connect said proximity fuse assembly and said projectile to said hollow winged external guidance frame when said projectile enters said hollow winged external guidance frame and exits said barrel such that said hollow winged external guidance frame is carried by said projectile whereby said onboard electronics of said hollow winged external guidance frame guide said projectile toward a target.

6. The winged vehicle as claimed in claim 5, wherein:
said proximity fuse assembly comprises a coupling rod;
said hollow winged external guidance frame includes a receiver;
an input port is provided upon said receiver of said hollow winged external guidance frame so as to receive input command pulses from said onboard electronics of said winged external guidance frame;
input/output contact points are respectively mounted upon said receiver of said hollow winged external guidance frame for receiving input command pulses from said input port mounted upon said receiver of said hollow winged external guidance frame and for transmitting said input command pulses to said coupling rod of said proximity fuse assembly; and
a detonator is mounted upon said projectile for receiving a detonation command from said contact points of said coupling rod.

7. The winged vehicle as claimed in claim 6, wherein:
said at least one set of male and female connectors mounted upon said proximity fuse assembly of said projectile and said receiver mounted upon said hollow winged external guidance frame, so as to operatively connect said proximity fuse assembly of said projectile to said hollow winged external guidance frame, comprises at least one set of movable male claws mounted upon said coupling rod of said proximity fuse assembly and at least one set of female sockets defined within said receiver of said hollow winged external guidance frame for accommodating said at least one set of movable male claws of said coupling rod.

8. The winged vehicle as claimed in claim 5, further comprising:
a dual external guidance system comprising said hollow winged external guidance frame that is attached said projectile, and an external guidance vehicle detachably attached to said hollow winged external guidance frame so as to be reusable.

* * * * *